United States Patent

Goloff et al.

[11] Patent Number: 5,564,676
[45] Date of Patent: Oct. 15, 1996

[54] SOLENOID VALVE ASSEMBLY

[75] Inventors: C. Nickolas Goloff, Secor; Joseph Reilly, Oak Park; Ronald E. Trost, Elgin; Zilek Liberfarb, Morton Grove, all of Ill.

[73] Assignee: Fluid Power Industries, Inc., Lincolnshire, Ill.

[21] Appl. No.: 514,981

[22] Filed: Aug. 14, 1995

Related U.S. Application Data

[63] Continuation of Ser. No. 203,700, Feb. 28, 1994, abandoned, which is a continuation of Ser. No. 976,142, Nov. 10, 1992, abandoned.

[51] Int. Cl.$^6$ ............................. F16K 31/02; H01F 7/126
[52] U.S. Cl. ...................... 251/129.15; 335/278; 335/281
[58] Field of Search ................. 251/129.15; 137/625.65; 335/255, 278, 281

[56] References Cited

U.S. PATENT DOCUMENTS

| | | | |
|---|---|---|---|
| 3,549,119 | 12/1970 | Sellers | 251/129.15 X |
| 3,670,768 | 6/1972 | Griswold | 251/129.15 |
| 4,540,154 | 9/1985 | Kolchinsky et al. | 251/129.15 |
| 4,712,582 | 12/1987 | Marks | 251/129.15 X |
| 4,795,098 | 1/1989 | Kirchner et al. | 251/129.16 X |
| 4,906,880 | 3/1990 | Miura | 251/129.15 X |
| 5,000,420 | 3/1991 | Hendrixon et al. | 251/129.15 X |
| 5,014,747 | 5/1991 | Suzuki | 137/625.65 |
| 5,180,138 | 1/1993 | Moldenhauer | 251/129.15 X |

FOREIGN PATENT DOCUMENTS

| | | |
|---|---|---|
| 166073 | 7/1954 | Australia . |
| 222898 | 9/1958 | Australia . |
| 416350 | 11/1966 | Australia . |
| 35491/71 | 5/1973 | Australia . |
| 633328 | 1/1992 | Australia . |
| 653908 | 9/1993 | Australia . |
| 0196621 | 10/1986 | European Pat. Off. . |
| 2154736 | 5/1972 | Germany . |

*Primary Examiner*—John Rivell
*Attorney, Agent, or Firm*—Roper & Quigg

[57] ABSTRACT

A solenoid valve assembly, subject to high vibration and shock induced loading, providing both axial and radial motion restraint of critical valve structures as economical means for achieving structural integrity.

16 Claims, 2 Drawing Sheets

SOLENOID VALVE ASSEMBLY

This is a continuation of application Ser. No. 08/203,700 of Feb. 28, 1994 now abandoned, which is a continuation of application Ser. No. 07/976,142 of Nov. 10, 1992 now abandoned.

TECHNICAL FIELD

This invention relates generally to solenoid valves. In one of its aspects it relates to the assembly of solenoid valves. In another of its aspects it relates to improving the resistance to failure of solenoid valve assemblies which encounter mechanical stress.

BACKGROUND ART

Solenoid valves have become a mainstay in the everyday operation of machinery. They find use in items ranging from household heating and cooling systems to automobile engines to control systems for the largest of modern construction equipment. They are particularly important in uses requiring instant response.

Solenoid valves have in recent years been designed utilizing computers to optimize the size, weight, material of construction and all other aspects that contribute to their improved usefulness in specialized applications. As the environments for these specialized applications have become increasingly hostile in recent years, valves designed for specific purposes can meet conditions in operation that involve stresses that approach the stress limitations of their design. For example, in heavy machinery applications of recent design, the valves can be subjected to high vibrational frequencies greatly exceeding those encountered in previous applications, with the result that even small design gaps resulting from machine tolerances can result in large stresses threatening the mechanical integrity of the components.

It is essential that such solenoid valves maintain their structural integrity for long periods of time, because premature failure of a solenoid valve under operating conditions has potentially serious results. Moreover, repair of a prematurely failed solenoid valve results in unanticipated maintenance and higher costs to the operator. Furthermore, loss of use of some large moving and construction equipment for even a short time can be costly.

It has been found that solenoid valves used in such equipment, installed in a standard configuration with the solenoid housing shell extending from the mounting and assembled with industry standard internal tolerances, can be subjected to conditions that cause excessive vibration, acting much like a bell vibrating on a fixed clapper, that builds up cantilever-type stress forces that result in mechanical failure of the coil and valve assembly.

Correcting this problem involves not only securing the valve train assembly to the solenoid assembly to eliminate harmful vibrations, but also accomplishing this without creating other stresses in the valve assembly. Since the process of securing the valve train assembly to the solenoid assembly entails applying pressure that compresses the solenoid assembly along its longitudinal axis, special care must be taken that the solenoid itself is not mechanically compressed and still has room within the components confining it to allow for thermal expansion without being subjected to forces that can cause windings to become broken or loosened. Moreover, the process of securing its valve train assembly to the solenoid assembly must be accomplished without requiring excessively tight machining tolerances that would greatly increase the cost of fabricating the solenoid valve. The present invention addresses these problems.

This invention provides means by which the mechanical integrity of a solenoid valve assembly can be better secured in an economical manner.

This invention provides means for reducing the possibility of vibrational stresses in a solenoid valve assembly.

This invention provides means by which compression can be applied to a solenoid valve assembly along its longitudinal axis without damage to the solenoid.

This invention also provides changes to solenoid valve assemblies that can be made to existing assemblies, in the field, without replacement of the entire assembly.

These and other aspects and advantages of this invention will become apparent upon reading this specification and studying the drawings and appended claims.

DISCLOSURE OF INVENTION

In accordance with the present invention there is provided improvement to the mechanical integrity of solenoid valve assemblies without subjecting the valve assemblies to undesirable, additional stresses.

The invention provides a solenoid valve assembly that has among its components: (A) a solenoid assembly which has as components (1) a central, open, cylindrical shaft adapted to accommodate a solenoid valve train, (2) a hollow, cylindrical solenoid coil surrounding and co-axial with the shaft and (3) a hollow, cylindrical housing shell surrounding and coaxial with the solenoid coil with the housing shell open at one end and closed at the other except for the central shaft that passes therethrough; (B) a solenoid valve train; (C) a first means for fixedly attaching the solenoid assembly to the solenoid valve train at the closed end of the housing shell; and (D) a second means for fixedly attaching the solenoid assembly to the solenoid valve train at the open end of the housing shell.

Second means for fixedly attaching the solenoid assembly to the valve train at the open end of the housing shell are chosen from the following:

(1) in combination, (a) a mounting adapter attached to the solenoid valve train with the mounting adapter having an external surface juxtaposable with a flux ring at the open end of the housing shell, and (b) a flux ring juxtaposable on a first surface with the external surface of the mounting adapter, juxtaposable on a second surface with the internal surface of the housing shell and comprising a shoulder on the second surface engageable with the open end of the shell, (2) in combination, (a) a mounting adapter attached to the solenoid valve train with the mounting adapter having an external surface juxtaposable with a flux ring at the open end of the housing shell, wherein the external surface of the mounting adapter comprises a frustoconically mateable surface which interacts with a frustoconically mateable surface on the flux ring, and (b) a flux ring juxtaposable on a first surface with the external surface of the mounting adapter, and juxtaposable on a second surface with the internal surface of the housing shell, wherein the first surface comprises a frustoconically mateable surface interacting with the frustoconically mateable surface on the mounting adapter;

(3) in combination, (a) a mounting adapter attached to the solenoid valve train with the mounting adapter having an external surface juxtaposable with a flux ring at the open end of the housing shell, and (b) a split flux ring juxtaposable on a first surface with the external surface of the mounting adapter, and juxtaposable on a second surface with the internal surface of the housing shell; and (4) in combination, (a) a mounting adapter attached to the solenoid valve train with the mounting adapter having an external surface juxtaposable with a flux ring at the open end of the housing shell, and (b) a flux ring juxtaposable on a first surface with the external surface of the mounting adapter, juxtaposable on a second surface with the internal surface of the housing shell with the second surface forming a curved shoulder with a sufficient recess to cause the housing shell to curl inward thereon when compressed.

First means for fixedly attaching the solenoid assembly to the valve train at the closed end of the housing shell are chosen from the following:

(1) securing means engageable with the solenoid valve train;

(2) a locking means threadedly engageable on its interior surface with the solenoid valve train;

(3) in combination, (a) a locking means threadedly engageable on its interior surface with the solenoid valve train and (b) a belleville washer juxtaposed between the locking means and the closed end of the shell; and (4) in combination, (a) a locking means threadedly engageable on its interior surface with the solenoid valve train with the locking means having a frustoconically mateable surface interacting with a frustoconically mateable surface on the closed end of the housing shell and (b) a frustoconically mateable surface on the closed end of the housing shell interacting with the frustoconically mateable surface on the locking means.

The first and second means for fixedly attaching the solenoid assembly to the solenoid valve train are made up of several different systems that can be used in any combination of first and second means. Each of the combinations provides a means for securing the solenoid valve assembly from vibrational stresses.

BRIEF DESCRIPTION OF DRAWINGS

In all figures the same numbers are used to identify the same items.

MODES FOR CARRYING OUT THE INVENTIONS

Figure 1:
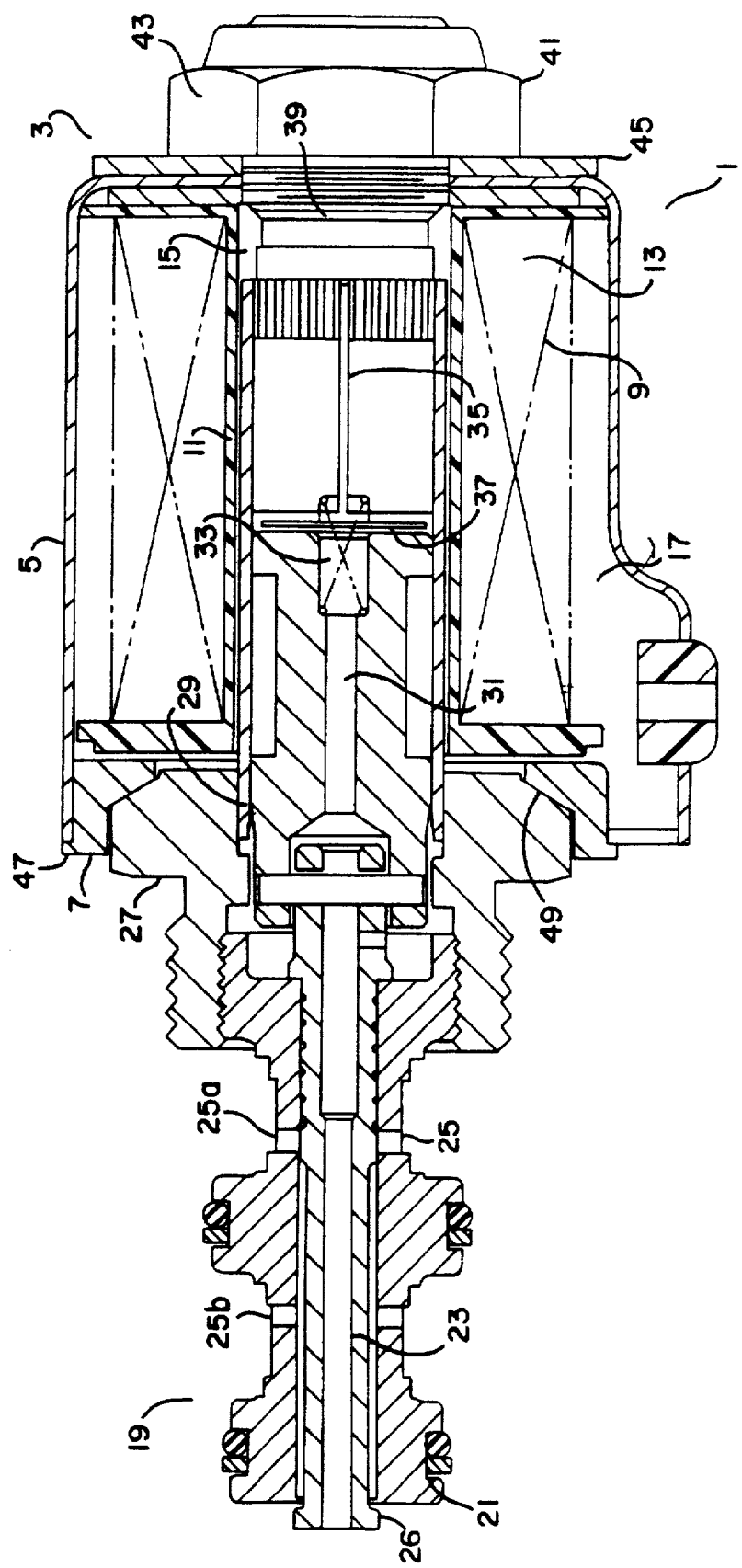
FIG. 1 is a diagrammatic section of a solenoid valve assembly of this invention showing frustoconically mateable surfaces and shouldered flux ring.

Referring now to FIG. 1, for the purposes of this invention the solenoid valve assembly 1 will be described as having two major parts: (A) the solenoid assembly 3 which includes the housing shell 5 and the solenoid coil 9 which is made up of a polymeric bobbin 11 on which the conductive metal windings 13 are wound and which has a central, open, cylindrical core 15, with the remainder of the interior of the housing being filled with a light weight, non-conductive, resin material 17, and (B) the solenoid valve train 19 which includes the cage 21 which forms the body of the train, the spool 23 which slides within the cage providing the opening or closing of the ports 25 and drain 26, the tube 29 which defines the body of the train that is within the solenoid assembly 3 and contains the armature 31 which is acted upon by causing the flow of current through the solenoid coil 9 to produce a magnetic field within the core 15 to move against the spring 33, pole piece 35, and metal washer 37.

As can be seen in the drawings, when the solenoid is activated and the spool 23 is pulled forward the inlet ports 25a are uncovered and the drain 26 is closed so that fluid can enter one set of ports 25a and be directed out of the ports 25b that are always open to pressurize the system. When the solenoid deactivates, the inlet ports 25a are closed and the drain 26 opens allowing the fluid to escape through the drain which depressurizes the system. In some systems the ports are equipped with screens to prevent dirt from entering the system.

The flux ring 7 and the mounting adapter 27 which operate to provide a stationary fit between the solenoid assembly 3 and the solenoid valve train 19 have, for the purposes of this invention, been characterized separately from the solenoid assembly and the solenoid valve train. In actual practice the mounting adapter can be a separate item that is an integral part of the machinery to which the valve assembly is to be attached, in which instance the mounting adapter can be equipped with threaded means for the valve train to be attached thereto. The mounting adapter can also, as shown here, be made a part of the valve train by being threadedly attached thereto or permanently attached, as by brazing. Similarly, the flux ring can be fabricated as part of the solenoid assembly.

Also for the purposes of this invention, the first means for fixedly attaching the solenoid assembly to the solenoid valve train at the closed end of the housing shell has been illustrated as a threaded end piece 39 that extends externally of the solenoid assembly to accommodate a locking means 41 which usually has a lock nut 43 and washer 45 combination; however, the first means can be any system which fixedly attaches the solenoid assembly to the solenoid valve train at the closed end of the housing shell such as a hole and cotter pin, C-ring etc.

Since the operation of the solenoid is based on the creation of a magnetic field, all of the parts of the solenoid valve assembly are metal, and most are steel. The washer 37 is brass, which, together with the tube 29 and the spring 33, are non-magnetic. The bobbin 11 and the filler for the housing have been noted previously as being made of non-magnetic resin.

The components of the means for attaching the solenoid assembly to the solenoid valve train act in cooperation to produce an axial compression force on the components of the valve train and solenoid assembly. This force holds the solenoid valve assembly in axial alignment and prevents vibration of the valve train within the solenoid assembly either in an axial or a radial direction. At the same time care is taken to prevent the application of axial pressure on the solenoid assembly in an amount sufficient to cause damage to the solenoid coil. Axial pressure can cause the windings of the solenoid to separate or even break. Separated windings are susceptible to vibrational damage by rubbing against each other causing loss of insulation or breaking with the possible, ultimate short circuiting of the coil.

In the solenoid valve assemblies that suffer the vibrational problems that inspired the present invention, a mounting adapter attached to a solenoid valve train is juxtaposed at an external surface with an internal surface of a flux ring. The fit is within specified tolerances to leave a minimum air gap between the mounting adapter and the bobbin, but the axial pressure applied by tightening a nut at the top of the valve train is not sufficient in combination with the tolerance allowed between the mounting adapter and the flux ring at the open end of the housing shell to provide alignment and stability to prevent bell-like vibration of the housing shell against the valve train acting as a fixed clapper thereby producing cantilever stress which can be sufficient to cause failure of the valve train, for example, at the joint of the mounting adapter and the tube.

The function Of the means for attaching the solenoid assembly to the solenoid valve train, as set out herein, can be explained with reference to the drawings. Referring to FIG. 1, such a means useful at the open end of the housing shell employs the combination of a mounting adapter 27 attached to the solenoid valve train 19 and a flux ring 7 which has a shoulder 47 on its surface that is adjacent to the inside of the housing shell 5. This shoulder 47 acts as a base for the open end of the housing shell 5 so that when axial compression is applied from the closed end of the housing shell 5 by torquing down the nut 43 or other device on top of the housing shell 5 the housing shell cannot slide past this shoulder and permit damage to the solenoid coil 9 (unless excessive compression is applied so as to buckle the housing shell) while sufficient axial pressure can be applied to the valve train to provide stability.

Referring to FIG. 1, both the mounting adapter and the flux ring have been shaped to provide mateably interacting frustoconical abutting surfaces 49. This allows the valve train 19 to which the mounting adapter 27 is attached and the solenoid assembly 3 with which the flux ring 7 is associated to be better and more securely aligned with one another providing sufficient radial restraint without requiring large axial compression loads on the solenoid assembly. By providing such mateably interacting surfaces, secure alignment is achieved without the necessity of fabricating components with excessively tight tolerances at uneconomical manufacturing costs.

Figure 2:
FIG. 2 is a diagrammatic section of a split flux ring.

Referring to FIG. 1 and FIG. 2, a split flux ring 51, can be used in conjunction with the mounting adapter 27. The split flux ring 51 acts as a radial clamp to prevent radial vibration while still allowing axial movement when axial pressure is being applied from the closed end of the housing shell 5. Such a split flux ring 51 design provides the additional benefit of reducing eddy currents and residual magnetism in the flux ring and solenoid assembly, resulting in faster valve response time.

Figure 3:
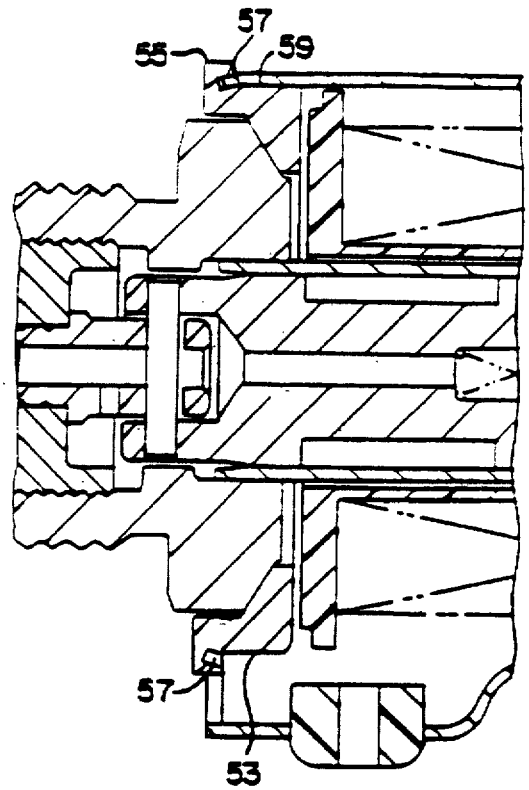
FIG. 3 is a diagrammatic section of a portion of a solenoid valve assembly of this invention showing a grooved, shouldered flux ring.

FIG. 3 shows a variation with a flux ring 53 with a shoulder 55 on its side adjacent the housing shell 5. The shoulder has a curved groove 57 to provide a surface that guides the open edge 59 of the housing shell 5 to curl inward when enough axial pressure is applied. This allows a maximizing of pressure application at the closed end of the housing shell by supplying a guide as to the amount of pressure that the system will still bear.

Turning now to means for attaching the solenoid assembly 3 to the valve train 19 at the closed end of the housing shell 5, FIG. 1, shows the common means of using a lock nut 43 and washer 45 to tighten down on the valve train 19 at the closed end of the housing shell 5. This means can be used with any of the means set out above to provide an improvement over the configurations formerly used for applying axial pressure on the solenoid valve assembly 1. As noted above, other means can also be used to attached the solenoid assembly 3 to the valve train 19 at the closed end of the housing shells.

Figure 4:
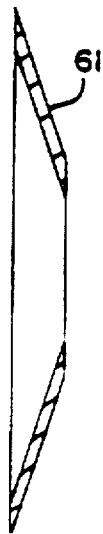
FIG. 4 is a diagrammatic section of a belleville washer.

Substituting a belleville washer 61 (See FIG. 4) for the plain washer 45 as set out above provides means for maintaining axial pressure in the event of plastic deformation of the solenoid coil 9. This adds the versatility of additional margin for error in the process of applying the axial pressure.

Figure 5:
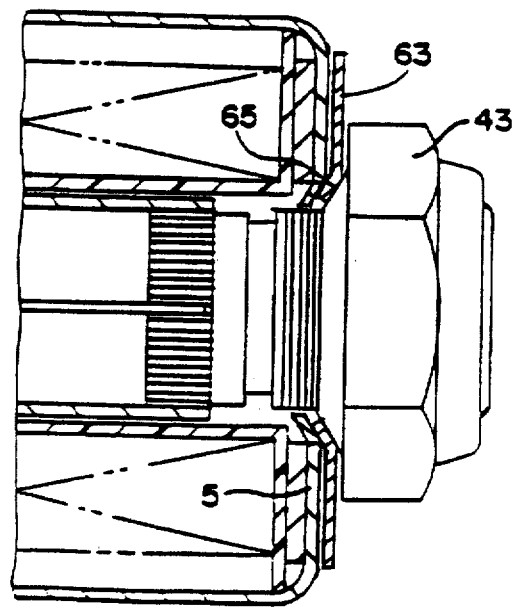
FIG. 5 is a diagrammatic section of a portion of a solenoid valve assembly of this invention showing frustoconically mateable surfaces.

In the valve assembly shown in FIG. 5, another means is depicted. In this embodiment, both the locking means, here a common lock nut 43 with a modified washer 63, and the housing shell 5 have been shaped to provide frustoconically mateable surfaces 65. This allows the valve train 19, to which the locking means 43,63 is attached, and the solenoid assembly 3, of which the housing shell 5 is a part, to be more accurately and more securely aligned with one another. Moreover, this embodiment is easily used as an adaption to existing solenoid valve assemblies currently in the field to provide at least a portion of the benefits of the present inventions.

In this description, the terminology "frustoconically mateable surfaces" has a meaning whereby either of the interacting surfaces can be the "frustoconical" surface, i.e. the protruding surface or the "frustoconically receptive" surface, i.e. the recessed surface.

It can be readily seen that the inventive means for applying axial pressure to a solenoid valve assembly set out above do not have to be limited to use as one from the open end of the housing shell list and one from the closed end list. There can be a great advantage, for example, in simultaneously using both the frustoconically mateable surfaces and the shoulder on the housing shell side of the flux ring at the open end of the housing shell.

What is claimed is:

1. A solenoid valve assembly comprising:
   (A) a solenoid assembly comprising:
      (1) a central, open, cylindrical shaft adapted to accommodate a solenoid valve train,
      (2) a hollow, substantially cylindrical solenoid coil co-axial with and surrounding at least a portion of said shaft, and
      (3) a hollow housing shell surrounding at least a portion of said solenoid coil, said housing shell being open at one end and closed at the other end except for said shaft which passes therethrough;
   (B) a solenoid valve train;
   (C) a means for attaching the solenoid assembly to said solenoid valve train at the closed end of said housing shell; and
   (D) a means for mateably connecting said solenoid assembly to said solenoid valve train at the open end of said housing shell, comprising:
      (1) a mounting adapter attached to said solenoid valve train, said mounting adapter having a non-planar external surface mateably interactable with an external first surface of a flux ring, said flux ring being located at the open end of said housing shell, and
      (2) said external first surface of said flux ring being non-planar and mateably interactable on said external first surface of said flux ring with said external surface of said mounting adapter, with said flux ring being juxtaposable on a second surface with an internal surface of said housing shell.

2. A solenoid valve assembly according to claim 1 wherein said external surface of said mounting adapter comprises a frustoconically mateable surface which interacts with said external first surface on said flux ring, and wherein said external first surface on said flux ring comprises a frustoconically mateable surface which interacts with said frustoconically mateable surface on said mounting adapter.

3. A solenoid valve assembly according to claim 1 wherein said flux ring is a split flux ring.

4. A solenoid valve assembly according to claim 1 further comprising a shoulder on said second surface of said flux ring, said shoulder being engageable with said open end of said housing shell.

5. A solenoid valve assembly according to claim 4 wherein said shoulder is a curved shoulder with a sufficient recess to cause said housing shell to curl inward thereon when said housing shell is compressed in the axial direction.

6. A solenoid valve assembly according to claim 2 wherein said flux ring comprises a split flux ring.

7. A solenoid value assembly according to claim 2 further comprising a shoulder on said second surface of said flux ring, said shoulder being engageable with said open end of said housing shell.

8. A solenoid valve assembly according to claim 7 wherein said shoulder comprises a curved shoulder with a sufficient recess to cause said housing shell to curl inward therein when said housing shell is compressed in the axial direction.

9. A solenoid valve assembly according to claim 1 wherein said means for attaching said solenoid assembly to said solenoid valve train at the closed end of said housing shell comprises a locking means threadedly engageable with said solenoid valve train.

10. A solenoid valve assembly according to claim 1 wherein said means for attaching said solenoid assembly to said solenoid valve train at the closed end of said housing shell comprises, in combination, (a) a locking means threadedly engageable with said solenoid valve train, and (b) a belleville washer juxtaposed between said locking means and the closed end of said shell.

11. A solenoid valve assembly according to claim 1 wherein said means for attaching said solenoid assembly to said solenoid valve train at the closed end of said housing shell comprises, in combination, (a) a locking means threadedly engageable with said solenoid valve train, said locking means having a frustoconically mateable exterior surface which interacts with an exterior surface on the closed end of said housing shell, and (b) wherein said exterior surface of the closed end of said housing shell comprises a frustoconically mateable surface which interacts with said frustoconically mateable surface on said locking means.

12. A solenoid valve assembly according to claim 11 wherein said flux ring comprises a split flux ring.

13. solenoid valve assembly comprising:

(A) a solenoid assembly comprising:
  (1) a central, open cylindrical shaft adapted to accommodate a solenoid valve train;
  (2) a hollow, substantially cylindrical solenoid coil co-axial with and surrounding at least a portion of said shaft, and
  (3) a hollow housing shell surrounding at least a portion of said solenoid coil, said solenoid coil being open at one end and closed at the other end except for said shaft which passes therethrough.

14. A solenoid valve assembly comprising:

(A) a solenoid assembly comprising:
  (1) a central, open cylindrical shaft adapted to accommodate a solenoid valve train;
  (2) a hollow, substantially cylindrical solenoid coil co-axial with and surrounding at least a portion of said shaft, and
  (3) a hollow housing shell surrounding at least a portion of said solenoid coil, said solenoid coil being open at one end and closed at the other end except for said shaft which passes therethrough;

(B) a solenoid valve train;

(C) a means for attaching the solenoid assembly to said solenoid valve train at the closed end of said housing shell, said means for attaching further comprising:
  (1) a locking means threadedly engageable with said solenoid valve train, said locking means having a frustoconically mateable exterior surface which interacts with an exterior surface on the closed end of said housing shell, and
  (2) wherein said exterior surface of the closed end of said housing shell comprises a frustoconically mateable surface which interacts with said frustoconically mateable surface on said locking means;

(D) a means for mateably connecting said solenoid assembly to said solenoid valve train at the open end of said housing shell, said means for mateably connecting comprising:
  (1) a mounting adapter attached to said solenoid valve train, said mounting adapter having a non-planar external surface mateably interactable with an external surface of a flux ring, said flux ring being located at the open end of said housing shell, and
  (2) said external surface of said flux ring being non-planar and mateably interactable on said external surface of said flux ring with said external surface of said mounting adapter.

15. A solenoid valve assembly according to claim 14 wherein said external surface of said mounting adapter comprises a frustoconically mateable surface which interacts with said external surface on said flux ring, and wherein said external surface on said flux ring comprises a frustoconically mateable surface which interacts with said frustoconically mateable surface on said mounting adapter.

16. A solenoid valve assembly according to claim 15 wherein said flux ring comprises a split flux ring.

* * * * *

UNITED STATES PATENT AND TRADEMARK OFFICE
CERTIFICATE OF CORRECTION

PATENT NO. : 5,564,676
DATED : October 15, 1996
INVENTOR(S) : C. Nickolas Goloff, Joseph Reilly, Ronald E. Trost, Zilek Liberfarb It is certified that error appears in the above-indentified patent and that said Letters Patent is hereby corrected as shown below:

On the title page, item ]73] Assignee: After "Fluid Power Industries, Inc., Lincolnshire, Illinois", insert the phrase --"and Caterpillar, Inc., Peoria, Illinois, jointly"--.

Signed and Sealed this

Twenty-fourth Day of June, 1997

*Attest:*

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,564,676
DATED : October 15, 1996
INVENTOR(S) : C. Nickolas Goloff, Joseph Reilly, Ronald E. Trost, Zilek Liberfarb It is certified that error appears in the above-indentified patent and that said Letters Patent is hereby corrected as shown below:

Claim 13 should read as follows:

13. A solenoid valve assembly comprising:
(A) a solenoid assembly comprising:
    (1) a central, open cylindrical shaft adapted to accommodate a solenoid valve train;
    (2) a hollow, substantially cylindrical solenoid coil co-axial with and surrounding at least a portion of said shaft, and
    (3) a hollow housing shell surrounding at least a portion of said solenoid coil, said solenoid coil being open at one end and closed at the other end except for said shaft which passes therethrough;
(B) a solenoid valve train;
(C) a means for attaching the solenoid assembly to said solenoid valve train at the closed end of said housing shell, said means for attaching further comprising:
    (1) a locking means threadedly engageable with said solenoid valve train, said locking means having a frustoconically mateable exterior surface which interacts with an exterior surface on the closed end of said housing shell, and

UNITED STATES PATENT AND TRADEMARK OFFICE
CERTIFICATE OF CORRECTION

PATENT NO. : 5,564,676
DATED : October 15, 1996
INVENTOR(S) : C. Nickolas Goloff, Joseph Reilly, Ronald E. Trost, Zilek Liberfarb It is certified that error appears in the above-indentified patent and that said Letters Patent is hereby corrected as shown below:

(2) wherein said exterior surface of the closed end of said housing shell comprises a frustoconically mateable surface which interacts with said frustoconically mateable surface on said locking means.

Signed and Sealed this

Eighth Day of July, 1997

*Attest:*

BRUCE LEHMAN

*Attesting Officer*     *Commissioner of Patents and Trademarks*